Dec. 7, 1971   W. G. PETTIT ET AL   3,624,901
WIRE STRIPPER AND CUTTER
Filed Aug. 26, 1969   3 Sheets-Sheet 3
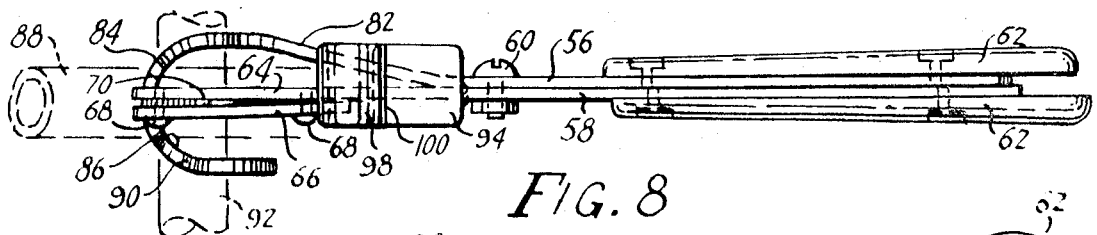
FIG. 8
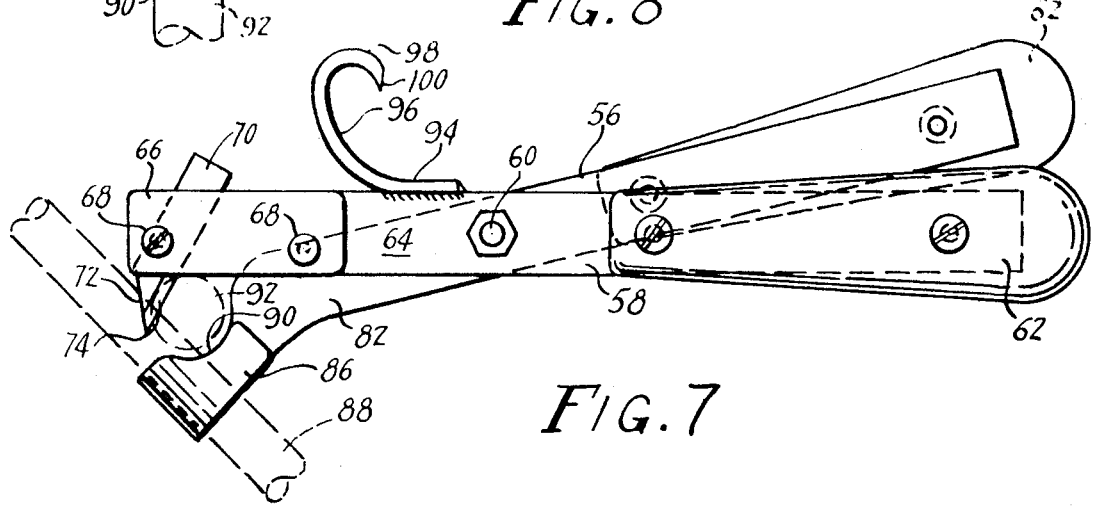
FIG. 7
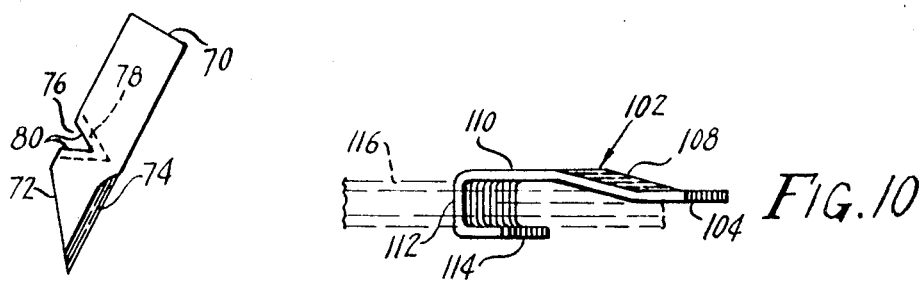
FIG. 11   FIG. 10
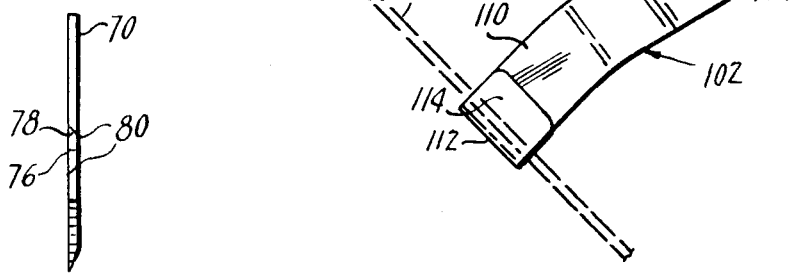
FIG. 12   FIG. 9
INVENTORS.
WALTER G. PETTIT
BY WALTER W. McCURRY
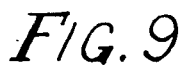
ATTORNEY.

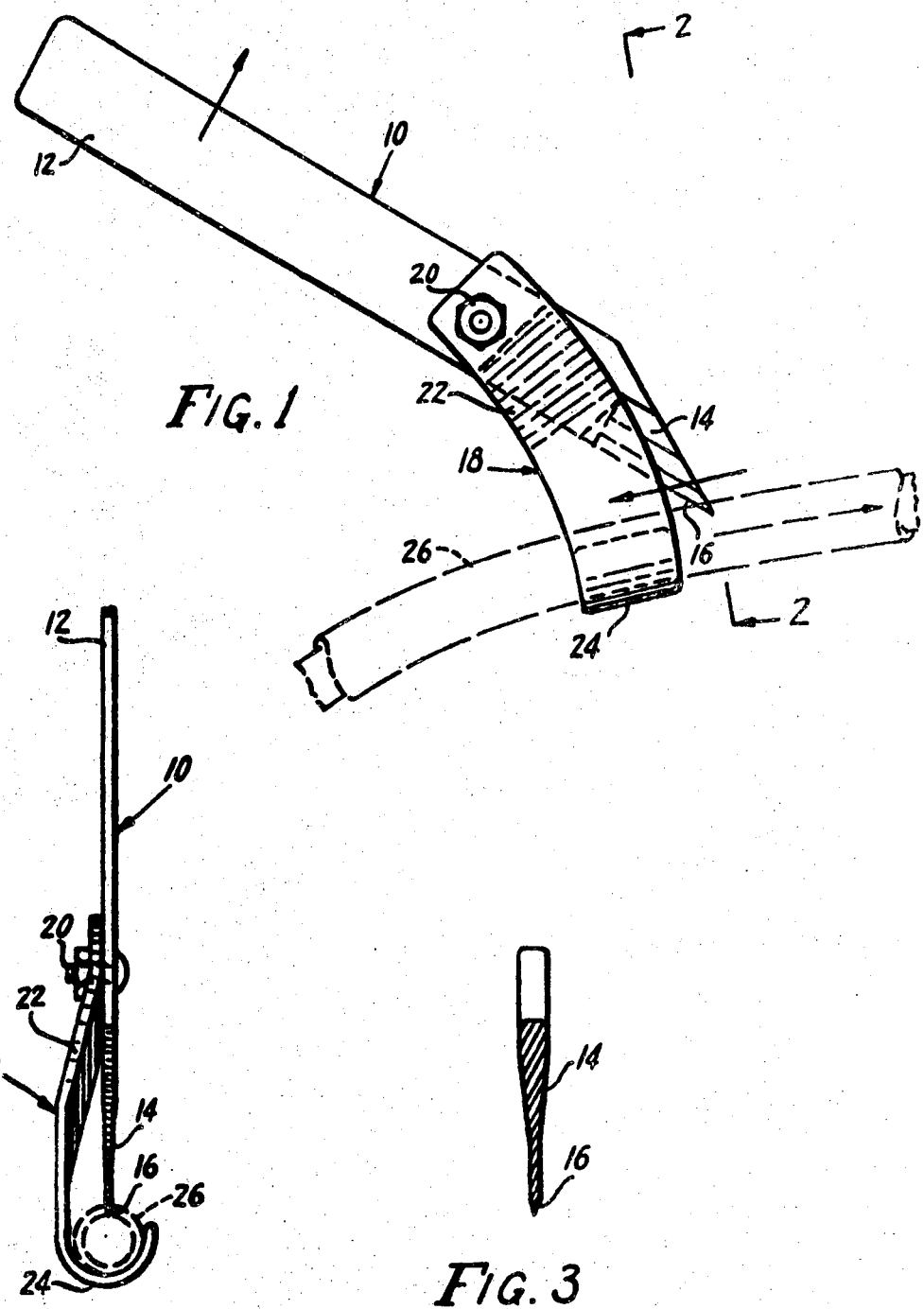

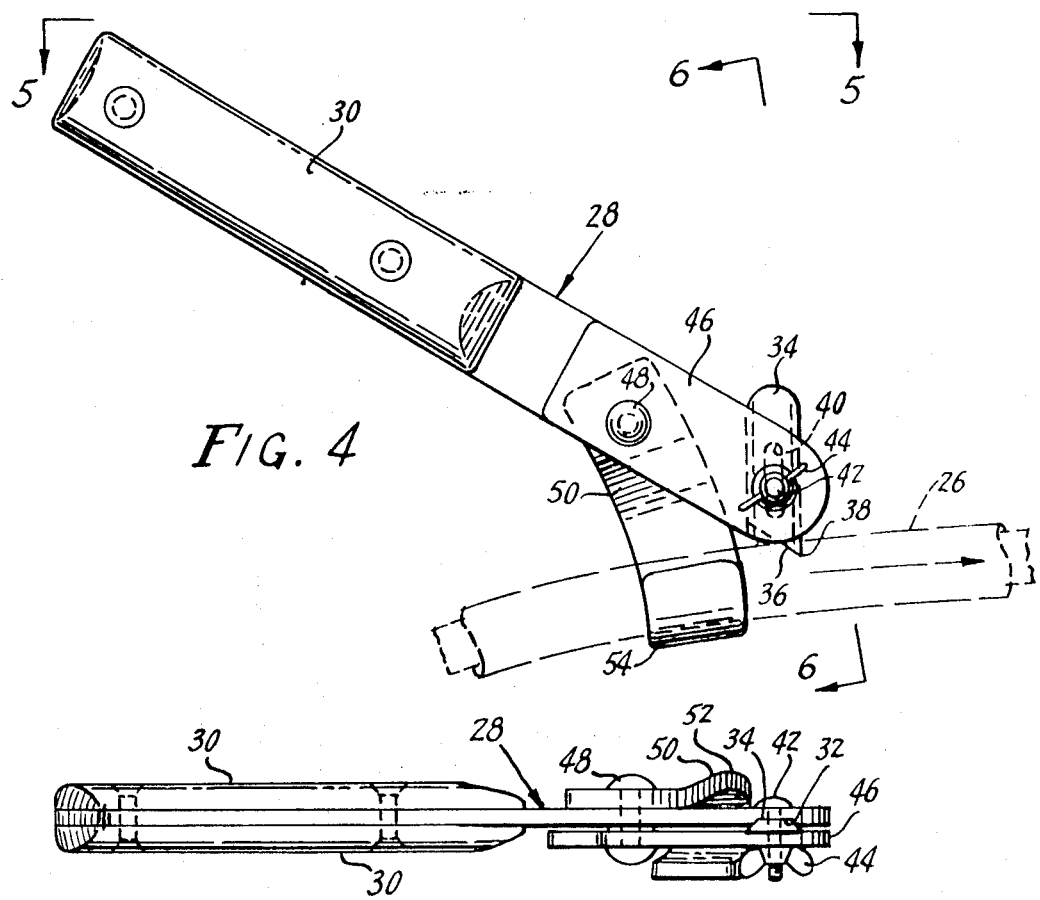
FIG. 4
FIG. 5
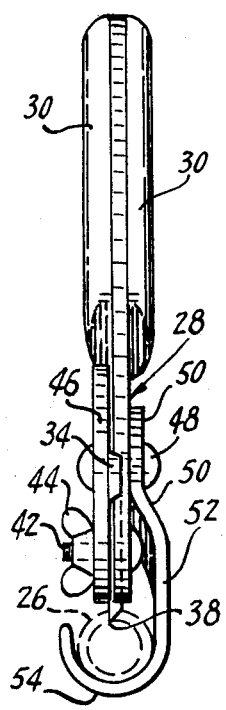
FIG. 6
INVENTORS.
WALTER G. PETTIT
BY WALTER W. McCURRY
Alexander B. Blair
ATTORNEY.

United States Patent Office  3,624,901
Patented Dec. 7, 1971

3,624,901
WIRE STRIPPER AND CUTTER
Walter G. Pettit, 8264 Tanoak Way, and Walter W. McCurry, 7812 Rosswood Drive, both of Citrus Heights, Calif. 95610
Continuation-in-part of application Ser. No. 811,497, Mar. 28, 1969. This application Aug. 26, 1969, Ser. No. 857,280
Int. Cl. H02g 1/12
U.S. Cl. 30—90.4                                    2 Claims

ABSTRACT OF THE DISCLOSURE

An operating handle, functioning as a lever, is provided with a hand grip at one end and a knife at the other end, and a work support in the form of a hook adapted to engage an insulated cable or the like is pivotally connected to the handle lever. The lever is operable to cause the knife to cut into and through the insulation of the cable, and after this has been done, the cable can be removed from the hook and the latter swung to an inoperative position to permit the knife to be used independently for stripping the wire or wires.

In a modified form of the invention scissors-like levers are employed, one of which is provided with a work support and the other with a cutting knife for slitting insulation of a cable or wire, and the work support is provided with transverse grooves to support a cable whereby the device may be rotated with the knife in engagement with the cable to cut circumferentially therearound through the insulation to facilitate the stripping of the latter from the wire. One of the levers may be provided with an upwardly extending hook to engage the insulation, whereby rotation of the device will cause the hook to break loose the insulation from the wire.

CROSS-REFERENCE TO RELATED APPLICATION

This application is a continuation-in-part of our copending application Ser. No. 811,497, filed Mar. 28, 1969, now abandoned, entitled "Wire Stripper and Cutter."

BACKGROUND OF THE INVENTION

Wire insulation cutters and strippers have been proposed, but these are usually open to objections. In many cases, the cable support is in the form of an eye through which the cable must be threaded, making it awkward to use the device in certain places. Moreover, the eyes do not, in many cases, support the cable so that it may be cut up closely. Moreover, prior devices employ cable supports or eyes which are fixed with respect to the handle so that it is necessary to use a separate knife in stripping insulation from the wires.

SUMMARY OF THE INVENTION

A handle in the form of a lever is provided at one end with a hand grip and at the other end with a knife. This knife tapers to a point for cutting through the cable insulation and is formed thin of hardened steel with a sharp point so as to cut very readily and hold its edge for a long time. A work support is pivotally connected at one end to the handle, spaced from the pointed knife, and provided at its free end with a hook in which the wire or cable is quickly and readily engageable without threading the cable therethrough. This permits the engagement of the hook on the cable after it has extended through a junction box or other cable and permits the device to be used close to the work. With the cable supported in the hook, the hand grip may be moved upwardly, causing the knife point to quickly and easily penetrate through the insulation. The work support may be replaced with similar devices of different sizes according to the cable to be cut.

In one form of the invention, the knife point may be formed integral with the handle lever, while in a modified form of the invention a separate knife may be employed and adjustably connected to the handle lever. In either case, after the cable insulation has been cut through lengthwise, the device may be removed from the cable and the work support swung to an inoperative position, whereupon the knife may be used for stripping the wires, thus eliminating the necessity for using a separate knife.

In another form of the invention, scissors-like levers are provided at one end with cooperating handle portions. The opposite ends of the levers are provided respectively with a cutting knife and a work support in which a cable or wire is adapted to rest while the knife slits the insulation longitudinally of the cable. The work support is substantially U-shaped and opposite sides thereof are provided with aligned arcuate grooves to receive the wire extending transversely of the levers so that rotation of the latter will cut through the insulation circumferentially thereof. The cutting knife is removable and is provided in one edge thereof with a V-shaped groove which may be used for stripping insulation from certain types of wires after the insulation has been cut. One of the levers adjacent the end opposite its handle portion is provided with an upwardly and inwardly curved hook terminating in a relatively sharp edge and adapted to receive therein a cable, the insulation of which has been cut circumferentially and longitudinally. With the sharp edge of the hook engaged in the longitudinal slit in the insulation, the device may be rotated around the cable to break the insulation loose from the wire.

BRIEF DESCRIPTION OF THE DRAWINGS

FIG. 1 is a face view of the device in operative position with respect to a cable, shown in dotted lines;
FIG. 2 is an end elevation of the same;
FIG. 3 is an enlarged detail sectional view transversely through the knife edge;
FIG. 4 is a face view similar to FIG. 1 of a modified form of the invention;
FIG. 5 is a plan view of the same;
FIG. 6 is an end elevation thereof;
FIG. 7 is a side elevation of a modified form of the invention;
FIG. 8 is a plan view thereof;
FIG. 9 is a fragmentary side elevation of a modified form of work support;
FIG. 10 is a plan view of the same;
FIG. 11 is a side elevation of the knife employed with the form of the invention in FIGS. 7 and 8; and
FIG. 12 is an edge view of such knife.

DESCRIPTION OF THE PREFERRED EMBODIMENTS

Referring to FIGS. 1 and 2, the numeral 10 designates a handle lever as a whole, which, in this case may be formed relatively flat of tool steel and has a free end 12 constituting a hand grip for operating the device. The other end of the handle lever is ground as at 14 to terminate at the bottom thereof in a knife edge 16 which is sharp and thin. If the device is formed of tool steel or otherwise hardened, the knife will very effectively and quickly cut the cable insulation and will seldom require sharpening.

A work support 18, shaped arcuately as shown in FIG. 1, has one end pivotally connected as at 20 to the handle lever. From the pivotal connection 20, the work support slopes downwardly and outwardly as at 22 away from the handle lever and terminates at its lower end in a semicylindrical hook 24, the center of which will be arranged substantially in vertical alignment with the cutting edge of the knife.

The hook 24 may be engaged with a cable 26 within a junction box or the like, and the cable will seat in the bottom of the hook 24. The handle 12 then may be swung upwardly as indicated by the arrow in FIG. 1, whereupon the knife edge will have its point move through the insulation to cut it longitudinally thereof to facilitate its removal from the end of the cable. The cable then may be removed from the hook 24 and the latter may be swung upwardly against the handle, thus freeing the knife edge for use as a cutter for stripping the wire. This eliminates the necessity for using a separate knife for this purpose. The use of the hook eliminates having to thread a cable through an eye and permits the placing of the hook in position and removing it from the cable by lateral movement of the hook relative to the cable. This greatly facilitates the use of the device within a box, as will be apparent.

A modified form of the invention is shown in FIGS. 4, 5 and 6, which employs a handle lever 28 which again may be flat, and if desired, may be provided with hand grips 30 of wood, plastic, or any other material. Adjacent to its lower end, the lever 28 is provided with a slot 32 adapted to receive a knife blade 34 having an angular cutting edge 36 at its lower end terminating in a point 38 adapted to cut through the cable 26. The blade 34 is vertically slotted in the position of this member in FIG. 4, as at 40, to receive a bolt 42 provided with a wing nut 44. Loosening this wing nut permits the blade 34 to be adjusted upwardly and downwardly, and the wing nut engages a holding plate 46 bearing against the blade 34. The left-hand or upper end of the plate 46 is fixed to the handle lever as at 48, the fastening element being either a rivet or a bolt, and this element is utilized as a pivotal connection for a work support 50. This work support, as in the previous case, has its portion beneath its pivot offset laterally from the handle lever as at 52 (FIG. 6) and terminates at its lower end in a semicylindrical hook 54 to receive and support the cable.

In the modified form of the device it is not necessary to provide hooks 54 of different sizes to support cables of different diameters, since adjustment may be made by loosening the wing nut 44 and adjusting the blade 34 upwardly or downwardly. The modified form of the device is used in the same manner as the form previously described, the hook 54 being engaged beneath the cable and the handle portion of the lever being swung upward to cause the knife edge to cut longitudinally through the insulation of the cable. Here again, the work support may be disconnected from the cable and swung upwardly against the handle lever to permit the cutting edge 36 to be freely used as a knife for stripping the cable.

A further modification of the invention is shown in FIGS. 7 and 8 wherein a pair of handle levers 56 and 58 are pivotally connected intermediate their ends as at 60. These levers are formed of flat stock and are provided to one side of the pivot with handle sections 62. The end 64 (FIG. 8) of the lever 58 is provided with a clamping plate 66 fixed thereto by screws or other fastening elements 68 and the lever end 64 and plate 66 receive therebetween a knife 70 having a tapered end 72 terminating in a pointed cutting edge 74. Intermediate its ends, the knife 70 is provided with a V-shaped groove 76, the sides of which are tapered as at 78 (FIG. 12) to provide relatively sharp cutting edges 80.

The end 82 of the lever 56 is curved back upon itself as at 84 to form a work support 86 adapted to receive a wire or cable 88, the arrangement being the same as the work support shown in each of the previously described forms of the invention. It will be apparent that after a cable 88 has been arranged in the work support 86, the handles 62 may be moved toward each other to cause the cutting point and edge of the knife 70 to penetrate the insulation, whereupon the device may be pulled toward the end of the wire to slit the insulation longitudinally.

After this is done, the device may be used for cutting the insulation circumferentially at the inner end of the slit formed by the knife 70. Opposite sides of the lever arm 82, this is, opposite sides of the work support 86, are provided with arcuate upper edge portions providing aligned transverse grooves 90 in which the wire or cable may be arranged as indicated by the dotted line 92 in FIG. 7. The device then may be rotated about the axis of the wire to cut completely through the insulation, whereupon the insulation may be stripped from the wire.

In the case of certain types of light insulations, the screws 68 may be loosened and the blade 70 removed, whereupon the V groove 76 may be engaged with the wire around the circumferential cut. Movement of the cutting knife longitudinally of the wire cause the cutting edges 80 to strip the insulation from the cable.

It will be apparent that the blade 70 is capable of adjustment according to the type of cable from which insulation is to be cut, for example, underground primary wire. This type of wire is provided with a thin plastic coating and a substantially thicker layer of plastic insulation surrounding the wire. The device is provided with means for facilitating the stripping of the insulation from such cable or wire after the insulation thereon has been cut circumferentially and longitudinally. The lever end 64 has welded thereon a hook member 94 which curves upwardly as at 96 and then turns back on itself as at 98 to terminate in sharp edge 100. After the insulation on heavy cables has been cut circumferentially and longitudinally, the hook portion 98 may be engaged around the cable adjacent the circumferential cut and with the edge 100 engaging the longitudinal slit in the insulation, the device may be rotated around the axis of the cable in a clockwise direction as viewed in FIG. 7. The edge 100 will then penetrate through the longitudinal slit in the insulation to break it loose from the wire, thus rendering it much easier to completely strip the end of the wire or cable.

The device is also useful in slitting between the wires of television antenna lead-ins wherein two spaced wires are connected by a web of insulation. It is the common practice for an operator to separate the ends of such wires by employing a razor blade, which is relatively slow and tedious and very often leaves insufficient insulation on one or both of the separated wires. Under such conditions, the modified type of work support shown in FIGS. 9 and 10 may be used. This work support is indicated as a whole by the numeral 102 and may be formed on the end of the lever arm 82 instead of the substantially semi-circular work support 86, or the device may be substituted for the work supports in FIGS. 1 and 4. When used in the latter manner, the work support 102 is provided with a shank portion 104 having an opening 106 to receive a pivot element such as the bolt 20 in FIG. 1. From the shank portion 104 the work holder inclines outwardly as at 108 (FIG. 10) and then extends parallel to the shank portion 104 as at 110. The end of the latter portion of the work handle then extends squarely across the as at 112 and has its free end 114 turned back upon the device parallel to the portion 110. A television lead-in 116 is adapted to lie flat against the work holder portion 112, whereupon the cutting knife of the device is adapted to slit between the two wires of the lead-in perfectly straight between such wires and centrally thereof. The ends of the two wires then may be readily stripped by using the present device and particularly the notch 76 in the blade 70.

From the foregoing it will now be seen that there is herein provided an improved wire stripper and cutter which accomplishes all of the objects of this invention and others, including many advantages of great practical utility and commercial importance.

As various embodiments may be made of this inventive concept, and as many modifications may be made in the embodiments hereinbefore shown and described, it is to be understood that all matter herein is to be interpreted merely as illustrative, and not in a limiting sense.

What is claimed is:

1. A cable cutter and stripper, comprising a pair of pivotally connected levers, a blade having a longitudinal edge and adjustably mounted to the end of one of said levers, a U-shaped cable support having an arcuate upper edge and extending from the corresponding end of the other of said levers at an angle in a direction away from said one of said levers, the center axis of said cable support being in the same plane as said one of said levers and the longitudinal axis of the cable to be longitudinally cut, and means independent of said blade and including said arcuate upper edge and the bottom of said one of said levers for supporting a cable to be circumferentially cut by said blade along a portion thereof between the ends thereof, the adjustable position of said blade being the same when longitudinally and circumferentially cutting the cable wherein the longitudinal cutting is made by one end of said blade only and the circumferential cutting is accomplished by the longitudinal edge of said blade being parallel with the tangent of said cable at the point where it is being cut.

2. The device of claim 1, including means connected to said one of said levers for limiting movement of said pair of levers relative to each other as the cable is being cut.

References Cited

UNITED STATES PATENTS

| | | | |
|---|---|---|---|
| 552,490 | 12/1895 | Benecke | 30—91.1 X |
| 1,011,157 | 12/1911 | Chytraus | 81—9.5 M X |
| 2,363,758 | 11/1944 | Thompson | 30—91.1 |

ROBERT C. RIORDON, Primary Examiner

G. L. SMITH, Assistant Examiner

U.S. Cl. X.R.

30—91.1, 91.2; 81—9.5 R